United States Patent
Story et al.

(10) Patent No.: US 11,551,092 B2
(45) Date of Patent: Jan. 10, 2023

(54) BRIDGE IMPACT DETECTION AND CLASSIFICATION SYSTEMS AND METHODS

(71) Applicant: SENSR Monitoring Technologies LLC, Georgetown, TX (US)

(72) Inventors: Brett Story, Rockwall, TX (US); Jase D. Sitton, Dallas, TX (US); John P. Orsak, Austin, TX (US); Walter F. Bleser, II, Denver, CO (US)

(73) Assignees: SOUTHERN METHODIST UNIVERSITY, Dallas, TX (US); SENSR Monitoring Technologies LLC, Georgetown, TX (US)

( * ) Notice: Subject to any disclaimer, the term of this patent is extended or adjusted under 35 U.S.C. 154(b) by 1156 days.

(21) Appl. No.: 16/129,062

(22) Filed: Sep. 12, 2018

(65) Prior Publication Data

US 2019/0080237 A1    Mar. 14, 2019

Related U.S. Application Data

(60) Provisional application No. 62/616,223, filed on Jan. 11, 2018, provisional application No. 62/558,156, filed on Sep. 13, 2017.

(51) Int. Cl.
*G06N 3/08* (2006.01)
*G06N 3/04* (2006.01)
(Continued)

(52) U.S. Cl.
CPC .......... *G06N 3/082* (2013.01); *G01P 15/0891* (2013.01); *G01P 15/135* (2013.01);
(Continued)

(58) Field of Classification Search
CPC ........ G06N 3/082; G06N 3/0454; G06N 3/08; G06N 3/084; G01P 15/0891; G01P 15/135; G01P 15/08; G06K 9/00536; G06K 9/6256; G06K 9/6267; G06K 9/6292; G06K 9/0053; G06V 10/82
See application file for complete search history.

(56) References Cited

U.S. PATENT DOCUMENTS

| | | | | |
|---|---|---|---|---|
| 5,373,486 | A | * | 12/1994 | Dowla .................. G01V 1/003 367/136 |
| 5,377,108 | A | * | 12/1994 | Nishio ................ G06N 3/0454 180/282 |

(Continued)

*Primary Examiner* — Aaron W Carter
(74) *Attorney, Agent, or Firm* — Parsons Behle & Latimer

(57) ABSTRACT

A method for classifying a response signal of acceleration data of a structure includes obtaining at least one signal feature of a response signal, inputting the at least one signal feature into an artificial neural network, and classifying, using the artificial neural network, the response signal as an impact event or a non-impact event. One or more signal features may be used, including a response length feature, a number of peaks feature, a spectral energy feature, a dominant frequency feature, a maximum response feature, a center of mass feature, a slope feature, an average peak power feature, a response symmetry feature, or combinations thereof. One or more artificial neural networks may be used. The artificial neural networks may be trained using different combinations of signal features.

28 Claims, 7 Drawing Sheets

(51) Int. Cl.
*G06K 9/62* (2022.01)
*G06K 9/00* (2022.01)
*G01P 15/08* (2006.01)
*G06V 10/82* (2022.01)
*G01P 15/135* (2006.01)

(52) U.S. Cl.
CPC ....... *G06K 9/00536* (2013.01); *G06K 9/6256* (2013.01); *G06K 9/6267* (2013.01); *G06N 3/0454* (2013.01); *G06N 3/08* (2013.01); *G06N 3/084* (2013.01); *G06V 10/82* (2022.01); *G01P 15/08* (2013.01)

(56) References Cited

U.S. PATENT DOCUMENTS

| | | | | |
|---|---|---|---|---|
| 5,579,232 | A * | 11/1996 | Tong | G05B 19/4065 706/912 |
| 6,257,064 | B1 * | 7/2001 | Duron | G01N 29/045 73/598 |
| 6,301,572 | B1 * | 10/2001 | Harrison | G01H 1/003 702/54 |
| 7,786,850 | B1 * | 8/2010 | Arcaini | G08G 1/04 340/436 |
| 9,267,862 | B1 * | 2/2016 | Kavars | G01M 5/0033 |
| 10,228,278 | B2 * | 3/2019 | Chen | G01M 7/00 |
| 11,150,158 | B2 * | 10/2021 | Orsak | G01M 5/0066 |
| 2002/0052679 | A1 * | 5/2002 | Kuhn | B60R 21/0132 701/45 |
| 2003/0065409 | A1 * | 4/2003 | Raeth | G08B 31/00 700/28 |
| 2004/0064426 | A1 * | 4/2004 | Depold | G06N 3/04 706/26 |
| 2013/0124445 | A1 * | 5/2013 | Bleser, II | G06Q 50/08 706/46 |
| 2015/0377694 | A1 * | 12/2015 | Shepard, Jr. | G01S 5/018 73/658 |
| 2016/0217226 | A1 * | 7/2016 | Westcott | G06F 9/455 |
| 2016/0342145 | A1 * | 11/2016 | Westcott | G06N 20/00 |
| 2018/0105131 | A1 * | 4/2018 | Freienstein | B60R 21/0136 |
| 2018/0224350 | A1 * | 8/2018 | Story | G01M 5/005 |
| 2018/0224352 | A1 * | 8/2018 | Zhang | G01M 7/08 |
| 2019/0080237 | A1 * | 3/2019 | Story | G06K 9/6256 |
| 2019/0101471 | A1 * | 4/2019 | Orsak | G01M 5/0066 |
| 2019/0122119 | A1 * | 4/2019 | Husain | G06N 3/086 |
| 2020/0191824 | A1 * | 6/2020 | Miki | G06F 16/24568 |
| 2022/0083793 | A1 * | 3/2022 | Abeloe | G06V 10/764 |
| 2022/0194448 | A1 * | 6/2022 | Mian | B61L 1/06 |

* cited by examiner

BRIDGE IMPACT DETECTION AND CLASSIFICATION SYSTEMS AND METHODS

CROSS REFERENCE TO RELATED APPLICATIONS

The present application claims the benefit of priority under 35 U.S.C. § 119 to U.S. Provisional Application No. 62/558,156, filed Sep. 13, 2017, entitled "BRIDGE IMPACT DETECTION AND CLASSIFICATION SYSTEMS AND METHODS," and U.S. Provisional Application No. 62/616,223, filed Jan. 11, 2018, entitled "BRIDGE IMPACT DETECTION AND CLASSIFICATION SYSTEMS AND METHODS," the disclosures of which are incorporated herein by reference in their entireties.

FIELD OF THE DISCLOSURE

The embodiments described herein relate generally to systems and methods for distinguishing between impacts to structures and excitation from normal operating loads on the structure. In particular, the disclosure relates to the use of neural networks to distinguish between vehicle strikes and vehicle traffic on bridges.

BACKGROUND

Bridges, such as low-clearance railroad bridges, are susceptible to impacts from vehicles that exceed the required clearance. Impacts may fall outside of a bridge's regular design considerations and may result in structural damage. It may be impractical to have an engineer watch the bridge constantly or review days of camera footage to determine impact events. Impacts can be detected by mounting accelerometers and inclinometers on the bridge. This instrumentation is capable of detecting and recording abnormal bridge responses and alerting stakeholders that an event has occurred; however, vehicle impacts are not the only cause of significant bridge responses for a bridge. A vehicle, such as a train, running over a railroad bridge may also generate a significant response, and responses produced by trains are not always dissimilar to those produced by vehicle impacts. A vehicle impact needs to be investigated due to the potential for structural damage, while a train crossing is part of a bridge's regular design considerations.

Accelerometers may be used to alert stakeholders when a threshold value has been exceeded, operating under the assumption that an impact causes larger lateral loads than a vehicle, such as a train, traveling across the structure. However, lighter impacts, such as a vehicle scraping along an underside of a bridge, may go unnoticed. Current systems may be reliant on railroad personnel, the police, and/or the general public to report strikes. Without any notification, a bridge may go uninspected but remain open to traffic. As a result, it could be many hours or days until debris and/or new damage is noticed and the bridge is inspected. Other disadvantages may exist.

SUMMARY

The present disclosure is directed to systems and methods that overcome some of the problems and disadvantages discussed above. Furthermore, although the embodiments herein have been described in the context of the railroad industry, it is appreciated that the system and methods disclosed herein may also be used to monitor other types of bridges.

Systems and methods for distinguishing between impacts and operating loads of a bridge include the use of artificial neural networks. Accelerometer signals are processed using neural networks to determine signal features to distinguish between strikes and operating loads.

A method for classifying a response signal of acceleration data of a structure comprises obtaining at least one signal feature of a response signal, inputting the at least one signal feature into an artificial neural network, and classifying, using the artificial neural network, the response signal as an impact event or a non-impact event. The at least one signal feature may be selected from the group consisting of a response length feature, a number of peaks feature, a spectral energy feature, a dominant frequency feature, a maximum response feature, a center of mass feature, a slope feature, an average peak power feature, and a response symmetry feature. The at least one signal feature may include at least one of the number of peaks feature, a spectral energy feature, or the center of mass feature. The at least one signal feature may be a plurality of signal features.

The plurality of signal features may be a first set of signal features and the artificial neural network may be a first artificial neural network, and the method may include inputting a second set of signal features of the response signal into a second artificial neural network, the second set being different from the first set, and classifying, using the second artificial neural network, the response signal as an impact event or a non-impact event. The first artificial neural network may have been trained using a first subset of features of a set of training events. The first subset of features may be the same features as the first set of signal features. The second artificial neural network may have been trained using a second subset of features of the set of training events. The second subset of features may be the same features as the second set of signal features.

The method may include weighing the classification of the first artificial neural network and the classification of the second artificial neural network to determine a final classification of the response signal as an impact event or a non-impact event. The first set of signal features may be input into and classified using a first cluster of neural networks including the first artificial neural network. The second set of signal features may be input into and classified using a second cluster of neural networks including the second artificial neural network.

The method may include inputting the at least one signal feature into at least one additional artificial neural network and classifying, using each of the at least one additional artificial neural network, the response signal as an impact event or a non-impact event. The method of may include weighing the classification of the artificial neural network and the classification of the at least one additional artificial neural network to determine a final classification of the response signal as an impact event or a non-impact event. The at least one additional artificial neural network may be a plurality of additional artificial neural networks.

A method for training an artificial neural network to distinguish between an impact event and a non-impact event includes obtaining signal data for a plurality of event signals. The plurality of event signals includes a plurality of training events and a plurality of validation events. The event signals include acceleration data. The signal data for each event signal includes an event signature of either an impact signature or a non-impact signature, and further includes at least one signal feature selected from the group consisting of a response length feature, a number of peaks feature, a spectral energy feature, a dominant frequency feature, a maximum response feature, a center of mass feature, a slope feature, an average peak power feature, and a response symmetry feature. The method includes training an artificial neural network by inputting the signal data of the training events of the plurality of event signals into a neural network, obtaining a predicted training signature from the artificial neural network for each of the training events, comparing the predicted training signatures with the event signatures to determine an error level, and iteratively adjusting a plurality of internal weights of the artificial neural network until the error level is below a selected threshold.

The method may include validating the artificial neural network by inputting the signal data of the validation events of the plurality of event signals into the artificial neural network, obtaining a predicted validation signature from the artificial neural network for each of the validation events, and comparing the predicted validation signatures with the event signatures to determine a performance level. The at least one signal feature may be a plurality of signal features. The artificial neural network may be a first neural network. The method may include training and validating a cluster of neural networks using the at least one signal feature, the cluster including the first neural network. Each of the artificial neural networks may have a different internal weight. The method may include training and validating a plurality of neural networks including the first neural network. Each of the plurality of neural networks may be trained and validated using different subsets of signal features.

A system for classifying a response signal of acceleration data of a structure includes at least one processor configured to analyze acceleration data of a structure and classify the acceleration data. The at least one processor is configured to: receive at least one signal feature of a response signal, the response signal comprising the acceleration data of the structure; input the at least one signal feature into an artificial neural network; and classify, using the artificial neural network, the response signal as an impact event or a non-impact event.

The at least one signal feature may be selected from the group consisting of a response length feature, a spectral energy feature, a number of peaks feature, a dominant frequency feature, a maximum response feature, a center of mass feature, a slope feature, an average peak power feature, and a response symmetry feature. The at least one signal feature may be a plurality of signal features. The plurality of signal features may be a first set of signal features and the artificial neural network may be a first artificial neural network. The at least one processor may be further configured to: input a second set of signal features of the response signal into a second artificial neural network, the second set of signal features being different from the first set of signal features; and classify, using the second artificial neural network, the response signal as an impact event or a non-impact event.

The at least one processor may be configured to train the first artificial neural network by obtaining signal data for a plurality of event signals. The plurality of event signals includes a plurality of training events and a plurality of validation events. The signal data for each event signal comprises an event signature of either an impact signature or a non-impact signature. The at least one processor may be configured to train the first artificial neural network by: inputting the signal data of the training events of the plurality of event signals into the first artificial neural network; obtaining a predicted training signature from the first artificial neural network for each of the training events; comparing the predicted training signatures with the event signatures to determine an error level; and adjusting iteratively a plurality of internal weights of the first artificial neural network until the error level is below a selected threshold.

Figure 1:
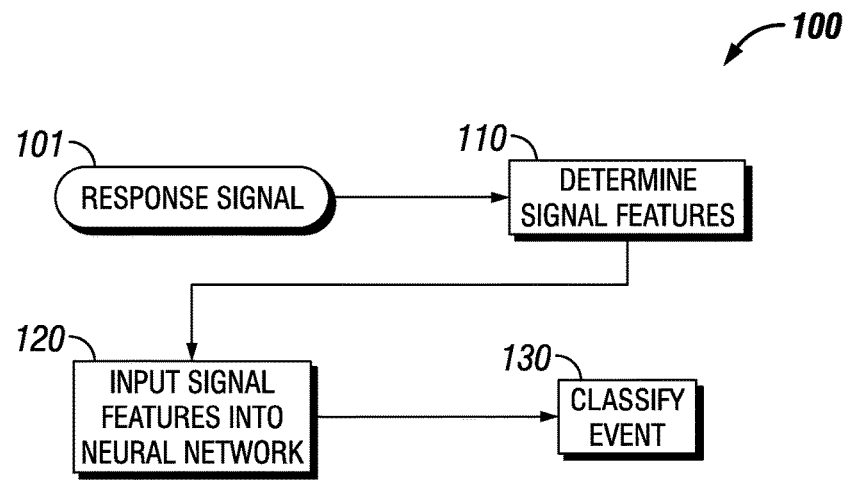
FIG. 1 shows a flowchart of an embodiment of a method for classifying a response signal between an impact event and a non-impact event.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 shows a flowchart of an embodiment of a method 100 for classifying a response signal 101 between an impact event and a non-impact event. The method 100 may include collecting a response signal 101, or the response signal 101 may have been previously collected. The response signal 101 corresponds to an event causing vibrations within a structure. The response signal 101 may be collected from a sensor mounted upon a bridge. The sensor may be installed on overpass bridge girders. The bridge may be a railroad bridge that supports a train traveling over the bridge. The event may be an impact or an operating load. A response signal for an impact event may be caused by a vehicle striking a portion of a bridge and be classified as having an impact signature. A response signal for an operating load event may be caused by conditions within the bridge's regular design considerations and be classified as having a non-impact signature. The operating load event may be caused by a train passing over the bridge on tracks and the non-impact signature may be classified as a train signature.

The response signal 101 includes acceleration data. In some embodiments, the response signal 101 may comprise only acceleration data over a time domain. The acceleration data may be analyzed to determine whether an impact occurred, and tilt data may show if any permanent rotation occurred. The acceleration data may include x-direction data, y-direction data, z-direction data, or combinations thereof. The maximum lateral acceleration during a train load may exceed the lateral acceleration recorded during an impact. This is often the case for light strikes and scrapes, which make up the majority of bridge impacts. The method 100 includes the Action 110 of determining signal features from the response signal 101. The signal features correspond to unique characteristics of acceleration data of the response signal 101 in either a time domain or frequency domain of the response signal 101. The acceleration data of an impact response signal may have a high initial magnitude and then quickly taper off.

The response signal 101 is processed in Action 110 and determines at least one signal feature selected from the group consisting of a response length feature, a number of peaks feature, a spectral energy feature, a dominant frequency feature, a maximum response feature, a center of mass feature, a slope feature, an average peak power feature, and a response symmetry feature. Subsets of signal features may be selected. The signal features selected may include the number of peaks feature and the center of mass feature. The signal features may include the spectral energy feature and the center of mass feature. In some embodiments, the group may not include an average peak power feature and/or a response symmetry feature. Action 110 of method 100 may include applying a fast Fourier transform to the time domain of the response signal 101 to obtain a frequency domain of the response signal 101. In some embodiments, the response signal 101 may be in the frequency domain and be converted to the time domain.

Figure 2:
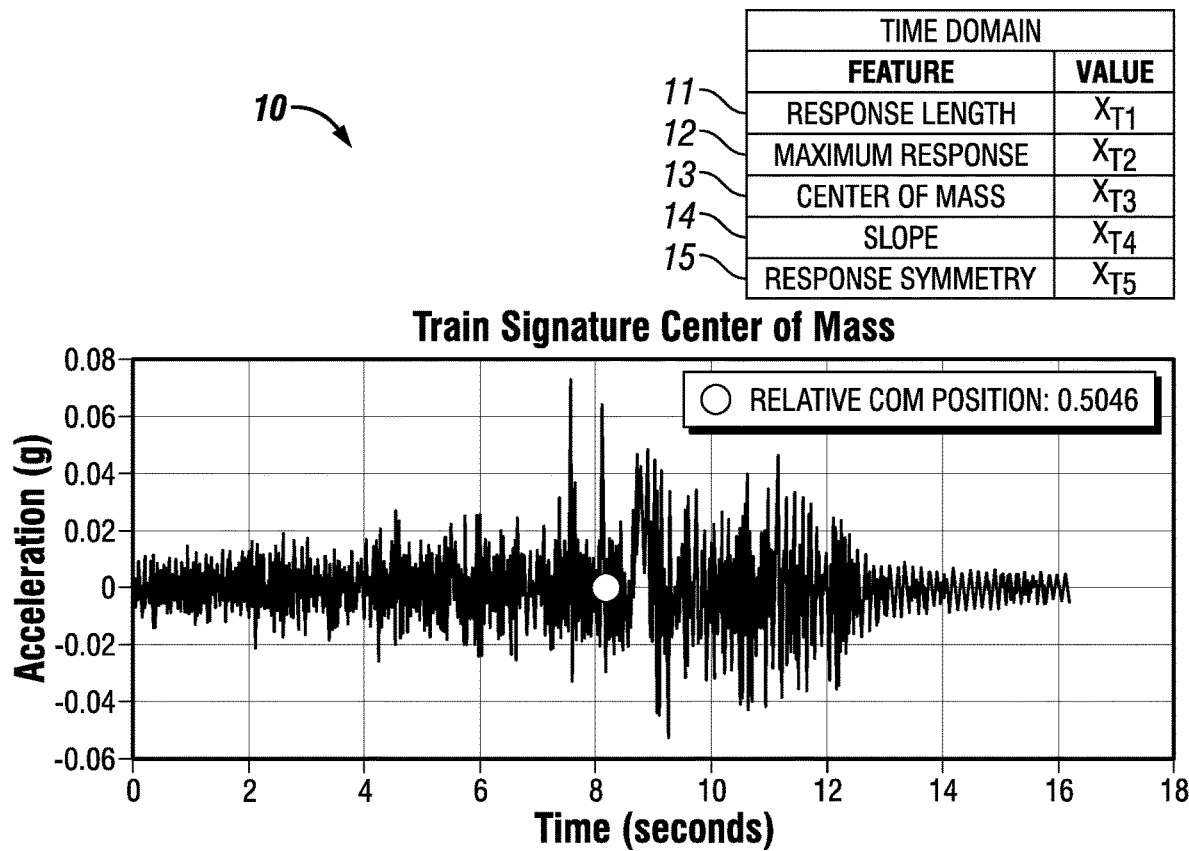
FIG. 2 shows an exemplary response signal for a train in the time domain.
Figure 3:
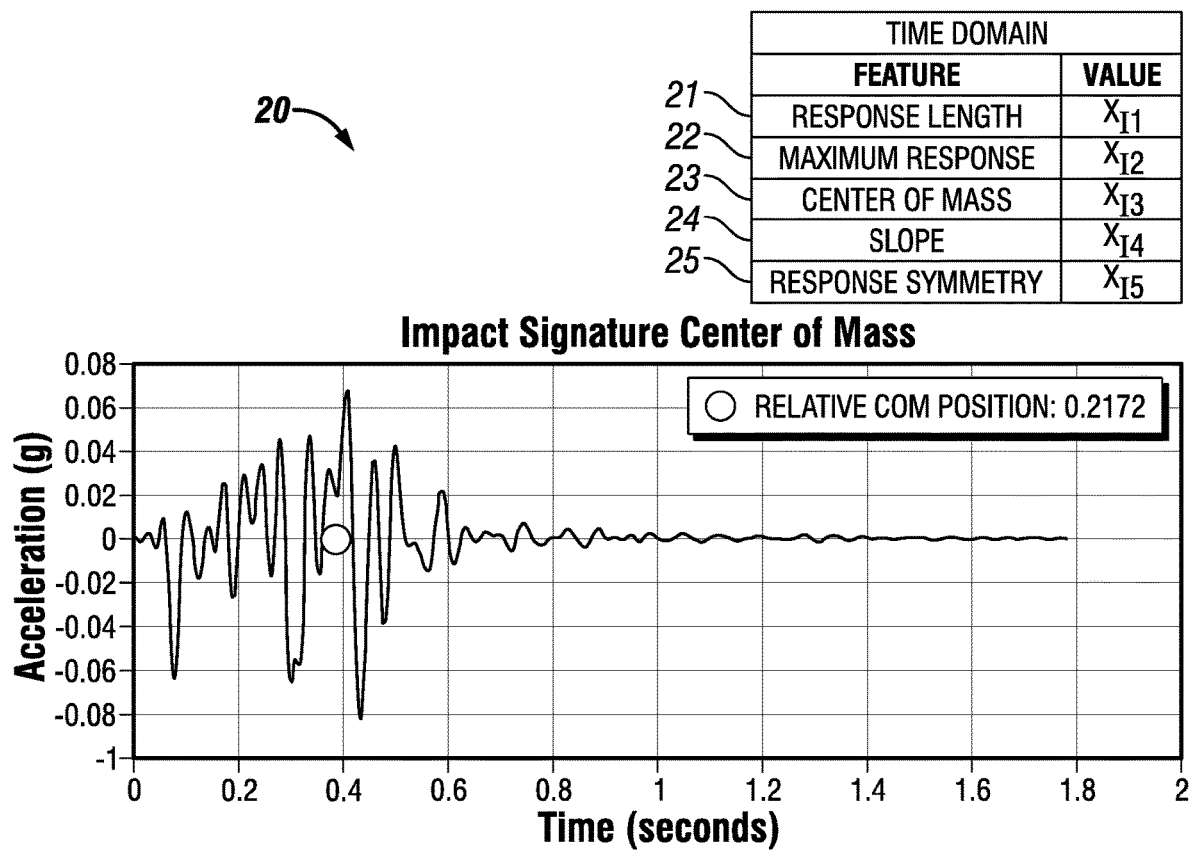
FIG. 3 shows an exemplary response signal for an impact in the time domain.
Figure 4:
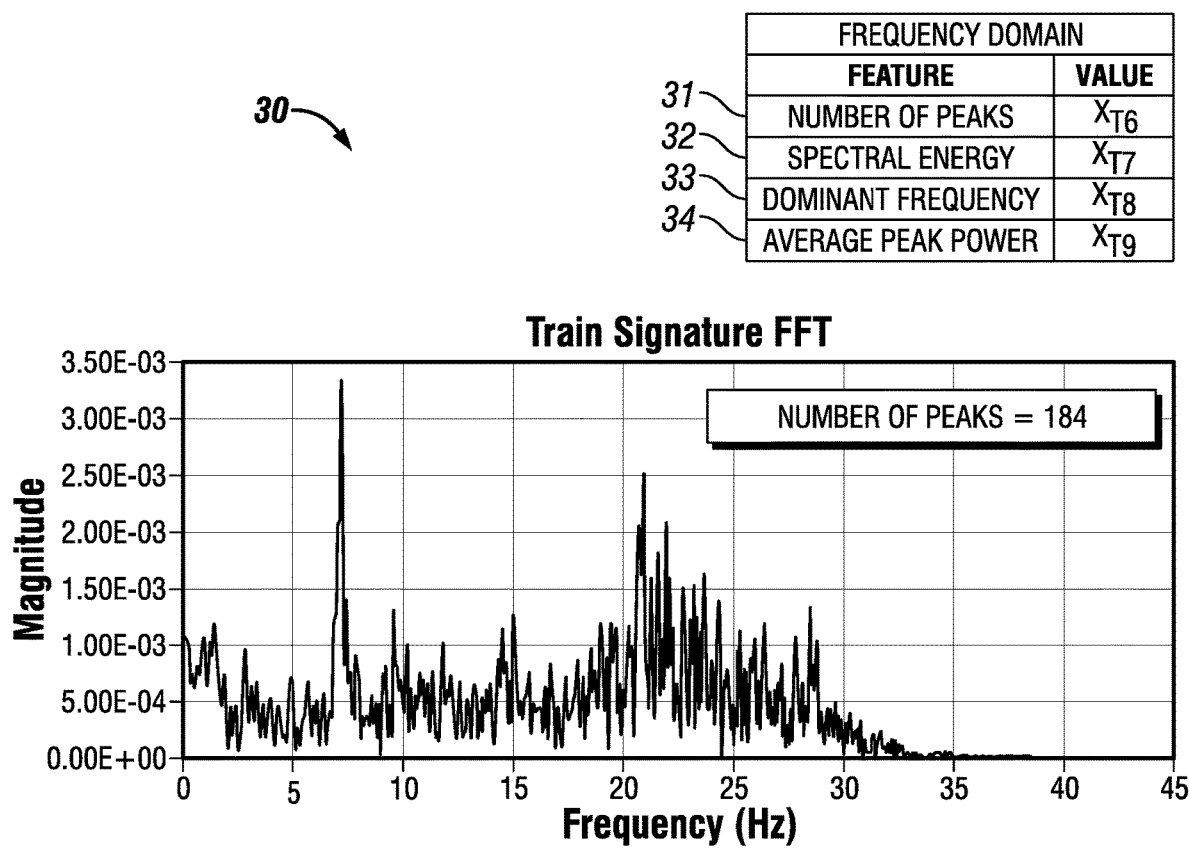
FIG. 4 shows an exemplary response signal for a train in the frequency domain.
Figure 5:
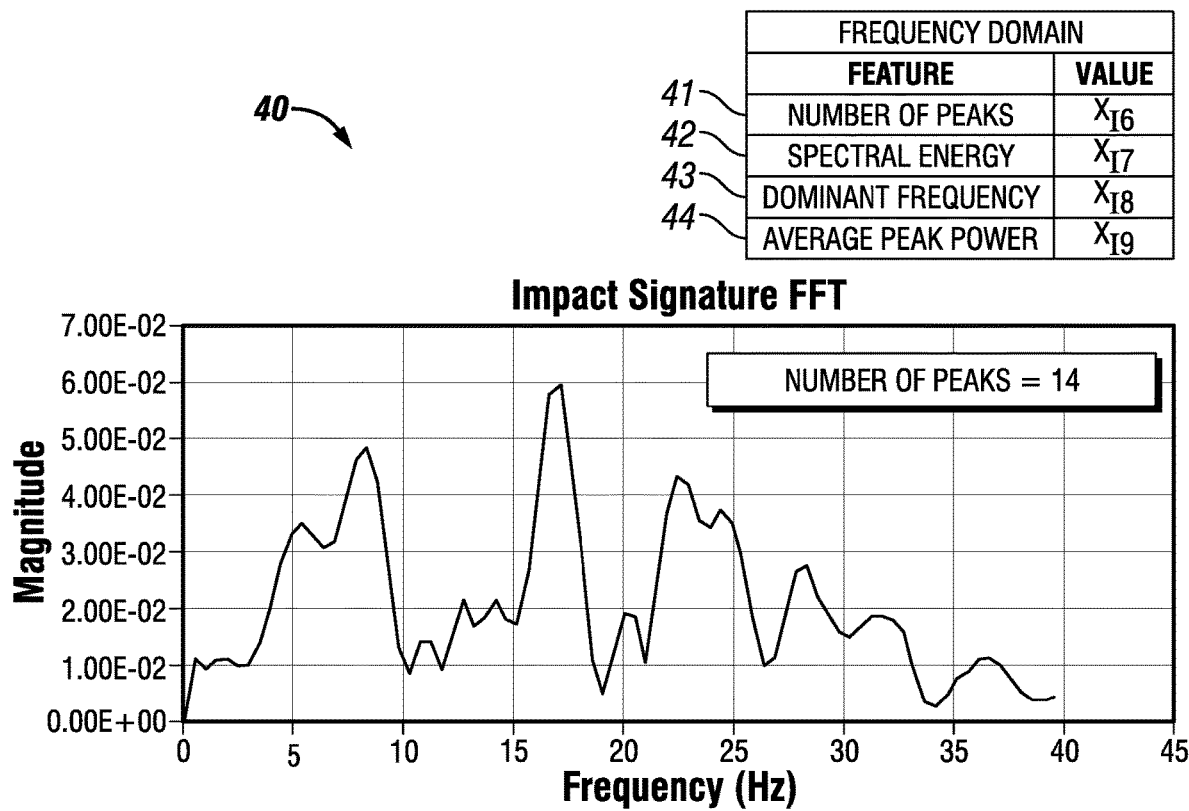
FIG. 5 shows an exemplary response signal for an impact in the frequency domain.

FIGS. 2-4 provide exemplary response signals 10, 20, 30, 40 that may be used as response signal 101 in method 100. FIG. 2 shows an example of a response signal 10 for a train signature in the time domain. The response signal 10 includes a response length feature 11, a maximum response feature 12, a center of mass feature 13, a slope feature 14, and a response symmetry feature 15. FIG. 3 shows an example of a response signal 20 of an impact signature in the time domain. The response signal 20 includes a response length feature 21, a maximum response feature 22, a center of mass feature 23, a slope feature 24, and a response symmetry feature 25. FIG. 4 shows an example of a response signal 30 for a train signature in the frequency domain. The response signal 30 includes a number of peaks feature 31, a spectral energy feature 32, a dominant frequency feature 33, and an average peak power feature 34. FIG. 5 shows an example of a response signal 40 of an impact signature in the frequency domain. The response signal 40 includes a number of peaks feature 41, a spectral energy feature 42, a dominant frequency feature 43, and an average peak power feature 44.

The response length feature comprises a length of the time domain of the response signal 101. The length of the time domain is the period when movement is detected by a sensor upon the structure. Movement may be determined by a period when acceleration data exceeds a noise threshold. For example, the response signal may comprise readings above a 0.005 g threshold, readings that are not at least a predetermined length apart, such as three seconds apart, may be considered a single response and account for momentary dips below the acceleration threshold, and/or readings less than a predetermined time period, such as one second, may be excluded. Depending on the location and normal operating parameters of the bridge, a higher threshold may be advantageous. The response length feature may be used to distinguish between impact signatures and train signatures. The response length feature 21 of impact signatures may be shorter than the response length feature 11 of train signatures. The response length feature 21 of impact signatures may last less than about three seconds. The response length feature 11 of train signatures may last more than about ten seconds.

The maximum response feature comprises the magnitude, in g, of the largest peak in the time domain of the response signal 101. The maximum response may be used to distinguish between impact signatures and train signatures. The maximum response feature 22 of impact signatures may be characterized by a sudden, sharp spike in acceleration followed by damped free vibration. The maximum response feature 12 of train signatures may be very noisy and may not contain the large acceleration spikes observed in impact signatures. However, in some instances, train signatures may contain a large acceleration spike due to the train entering or leaving the bridge.

The center of mass feature corresponds to the symmetry of the time domain of the response signal 101. The center of mass feature comprises the summation of the product of the magnitude of the time domain of the response signal $R_i$ with its corresponding time $t_i$ divided by the summation of the magnitude of the time domain of the response signals $R_i$ across an event: $COM=\Sigma|R_i|t_i/|R_i|$. The center of mass feature may be represented as a non-dimensionalized number between 0 and 1. The center of mass feature may be used to distinguish between impact signatures and train signatures. Train signatures may be symmetric and have a relative center of mass close to 0.5, while impact signatures are front-loaded and have a relative center of mass that is lower than train signatures. The center of mass feature 23 of the impact signature may therefore be lower than the center of mass feature 13 of the train signature.

The slope feature comprises the maximum slope between the first magnitude, in g, in the time domain of the response signal 101 and every other magnitude in the domain response is calculated. The slope feature may exclude z-direction acceleration data. The slope feature may be used to distinguish between impact signatures and train signatures. An impact signature may contain large spikes early in the response and may have a higher slope feature 24 than a slope feature 14 of a train signature. The response symmetry feature comprises a ratio of the average magnitudes of the first half and the second half of the length of the time domain of the response signal 101.

The number of peaks feature comprises a number of peaks within the frequency domain of the response signal 101. The number of peaks feature may be used to distinguish between impact signatures and train signatures. Impact signatures may include fewer peaks than train signatures, and the number of peaks feature 41 of an impact signature may be less than the number of peaks feature 31 of a train signature. The spectral energy feature comprises the sum of the squared fast Fourier transform coefficients. The spectral energy feature may be determined by calculating a power spectral density for each discrete frequency in the frequency domain of the response signal 101. The power spectral density is the average of squared values for that discrete frequency. The spectral energy feature is the sum of the power spectral densities across all frequencies of the response signal 101. Impact signatures may include a spectral energy feature 42 that is greater than a spectral energy feature 32 of train signatures. In some embodiments, the spectral energy feature may be used in lieu of the number of peaks feature. In some instances, the spectral energy feature may be advantageous as it is less dependent upon sampling rate and the response length than the number of peaks feature.

The dominant frequency feature comprises the peak in the frequency domain of the response signal 101 with the largest magnitude. The dominant frequency feature may be used to distinguish between impact signatures and train signatures. Bridge impacts cause the bridge to vibrate freely, while trains may not since they remain on the bridge for the duration of the response signal 101. However, in some instances, the natural frequency of the bridge may be the dominant frequency and be caused by both trains and impacts. The average peak power feature comprises the average magnitude of the peaks in the frequency domain of the response signal 101.

The method 100 includes the Action 120 of inputting at least one signal feature of the response signal 101 into an artificial neural network and the Action 130 of classifying the event that corresponds to the response signal 101. A plurality of signal features may be used. The artificial neural network classifies the response signal 101 as either an impact signature or a non-impact signature and classifies the event corresponding to the response signal 101 as an impact event if the response signal 101 has an impact signature or as a non-impact event if the response signal 101 has a non-impact signature.

Figure 6:
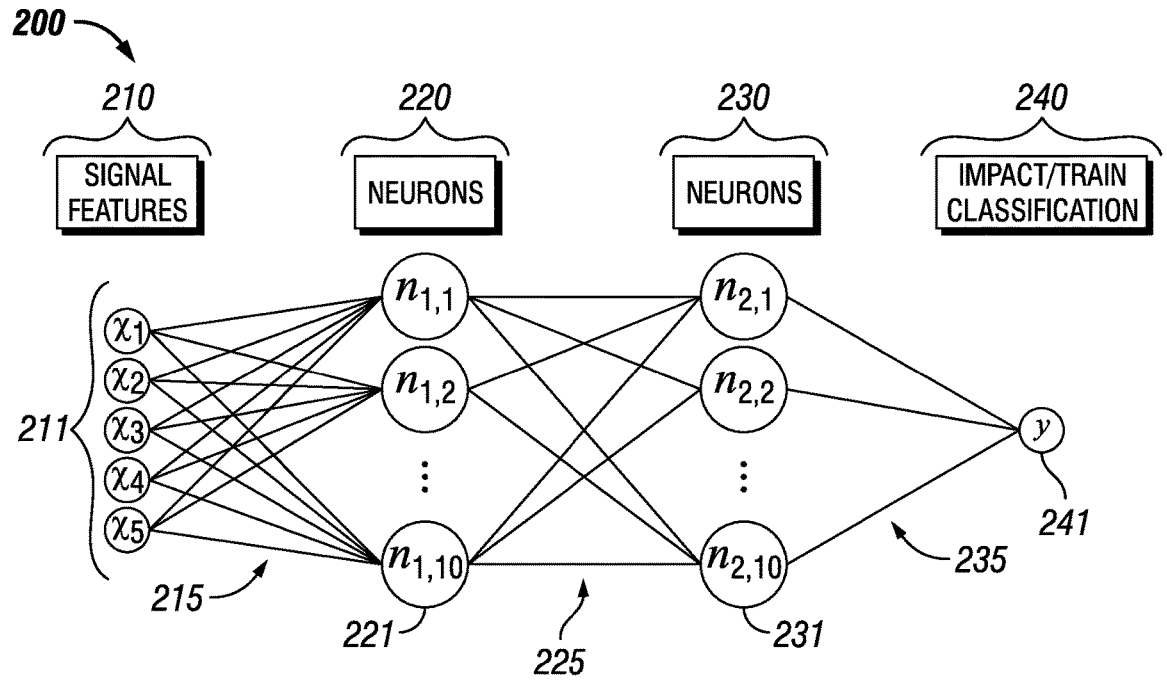
FIG. 6 shows a schematic diagram of an embodiment of an artificial neural network for classifying response signals.

FIG. 6 shows a schematic diagram of an embodiment of an artificial neural network 200. The artificial neural network 200 includes an input layer 210, a first hidden layer 220, a second hidden layer 230, and an output layer 240. The artificial neural network 200 uses a series of weights and biases to calculate an output based on a given input. More particularly, the input layer 210 includes an input vector 211 of signal features that is multiplied by a set of weights 215. Each signal feature of the input vector 211 is multiplied by a separate weight 215 and then collected at the beginning of the first hidden layer 220. The collected values are added together and then fed into the neurons 221 of the first hidden layer 220. The neurons 221 of the first hidden layer 220 pass the collected values through transfer functions. The transfer functions may be sigmoid or linear functions. The outputs of the transfer functions are then multiplied by a separate set of weights 225. Next, the values can be either collected and passed through a second hidden layer 230 with neurons 231 and additional weights 235 or sent directly to the output layer 240 to output a classification 241. Additional hidden layers and/or neurons may be utilized.

Figure 7:
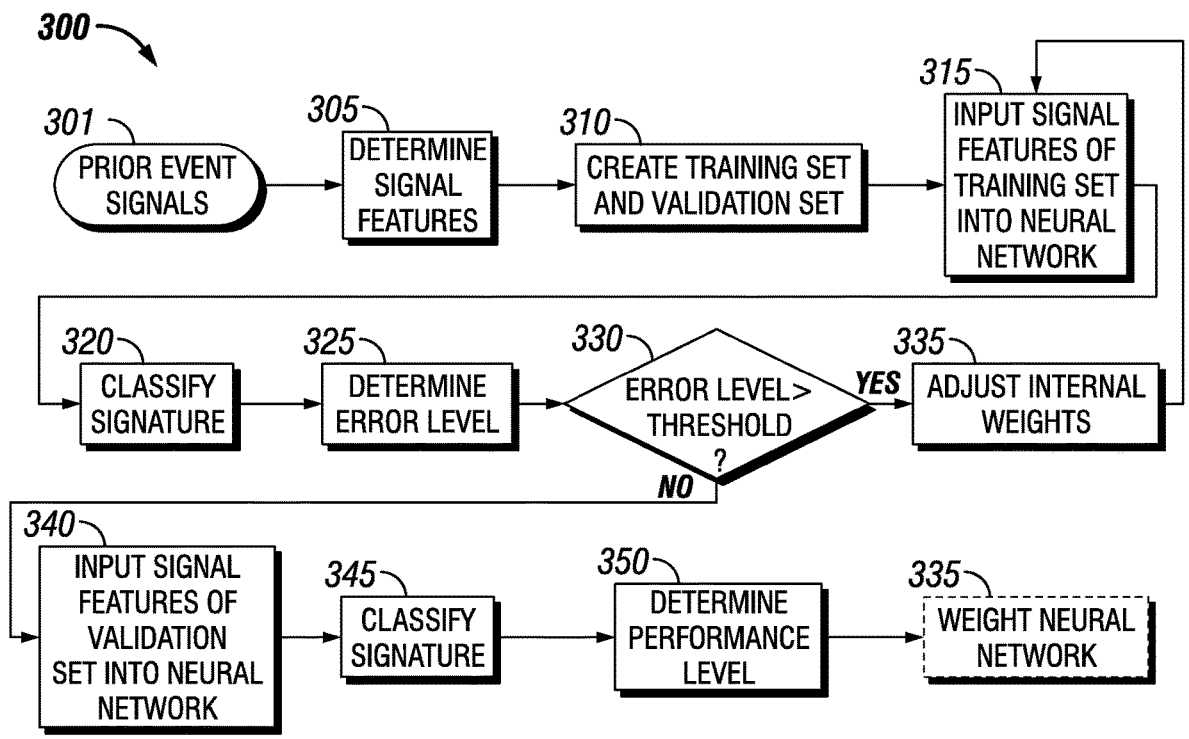
FIG. 7 shows a flowchart of an embodiment of a method for training an artificial neural network to distinguish between an impact event and a non-impact event.

FIG. 7 shows a flowchart of an embodiment of a method 300 for training an artificial neural network to distinguish between an impact event and a non-impact event. The artificial neural network may be trained without the use of a structural finite element model. The method 300 includes the Action 305 of determining signal features from a set of prior event signals 301, or the signal features may have been previously determined. The set of prior event signals are response signals that include impact events having known impact signatures and non-impact events having known non-impact signatures. The known impact signatures may be light to intermediate signatures that have a magnitude below the magnitude of a typical train load. Light to intermediate signatures may include strikes resulting in only cosmetic damage or with no permanent deformation or movement. Heavy strikes, by contrast, cause structural damage and may be detected using magnitude-based thresholds that will exceed typical train loads upon the structure.

The method 300 includes the Action 310 of creating from the set of prior event signals 301 a training set and a validation set. Each of the training set and the validation set include both impact events and non-impact events. Signal features of the training set of the prior event signals 301 are used as inputs to train the artificial neural network in Action 315. The non-impact events may be exclusive to the structure corresponding to a response signal for which the artificial neural network is being trained. The impact events may be non-exclusive to the structure corresponding to a response signal for which the artificial neural network is being trained. A set of prior event signals 301 for a bridge may contain predominantly non-impact events. Impact events may be few in number due to the rarity of impacts experienced in comparison to the number of non-impact events. For instance, trains may cross a bridge many times a day, but many weeks may pass between impacts from vehicles that exceed the required clearance under the bridge. The non-impact events corresponding to train crossings of a particular bridge may be used to train an artificial neural network for that bridge while impact events corresponding to vehicle strikes on multiple bridges may also be used to train the same neural network. In some embodiments, only impact events corresponding to vehicle strikes on a particular bridge may be used to train an artificial neural network for that bridge. More bridge-specific data that is available to train an artificial neural network may increase the artificial neural network's accuracy. In still other embodiments, impact events corresponding to vehicle strikes on multiple bridges may be used to initially train an artificial neural network and impact events corresponding to vehicle strikes only on that particular bridge may be used to retrain the artificial neural network at a later time.

As the signal features of the training set of the prior event signals 301 are input into an artificial neural network, such as artificial neural network 200, the artificial neural network classifies the signature of the prior event signals 301 in Action 320. The classifications by the artificial neural network 200 may be trained by calculating the error level between the artificial neural network 200's output and the known target output of the prior event signals 301 in Action 325. Initially, the error level may be high due to how the weights within the artificial neural network are initialized. If the error level is greater than a selected threshold as determined by Decision 330, the artificial neural network 200 "learns" by adjusting or scaling its internal weights and biases in Action 335 in order to minimize the error function. Actions 315-330 are repeated until the error level is below the selected threshold. This training scheme is referred to as back propagation and the artificial neural network may be referred to as a back-propagated neural network ("BPNN").

The method 300 may include validating the training of the artificial neural network. The validation set is used to determine the effectiveness of the training of the artificial neural network. In Action 340, the signal features of the validation set are input into the artificial neural network. The artificial neural network processes the validation set according to the updated weights and biases and classifies the signature of the prior event signals 301 in Action 345. The classified signatures of the validation set are then compared to the known signatures. The performance level of the artificial neural network is calculated in Action 350 and corresponds to the ratio of the number of correctly classified signatures to the total number of prior event signals of the validation set. In some embodiments, a specific neural network may be given a weight in Action 355 that corresponds to the performance level of the artificial neural network. For example, if the artificial neural network has a performance level below a selected threshold, the artificial neural network's classification may be given less or no weight.

Figure 8:
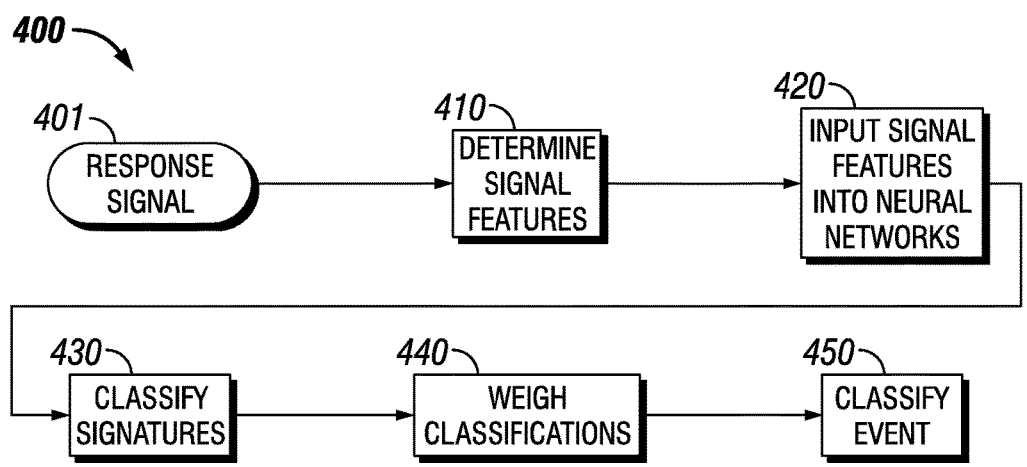
FIG. 8 shows a flowchart of an embodiment of a method for classifying a response signal between an impact event and a non-impact event using a plurality of neural networks.

FIG. 8 shows a flowchart of an embodiment of a method 400 for classifying a response signal 401 between an impact event and a non-impact event using a plurality of neural networks. The method 400 includes the Action 410 of determining signal features from the response signal 401. The signal features correspond to unique characteristics of acceleration data of the response signal 401 in either a time domain or frequency domain of the response signal 401. The method 400 includes the Action 420 of inputting at least one signal feature of the response signal 401 into a plurality of neural networks. Each of the plurality of neural networks includes a different network architecture. The plurality of neural networks may each be trained individually as described above with respect to a single neural network. The plurality of neural networks may each be trained using the same training set of data. However, the initialized and randomized weights and biases may be different for each of the plurality of neural networks and result in different trained weights for the artificial neural networks. The different trained weights present different network architectures.

In Action 430, each of the plurality of neural networks classifies the response signal as either an impact signature or a non-impact signature. In Action 440, the classifications of the artificial neural networks are weighed and in Action 450 a final classification of the response signal is made as either an impact event or a non-impact event. By way of example, each neural network's classification may be equally weighted resulting in a final classification of an impact event if a majority "vote" of classifications of the artificial neural networks are an impact signature. Other threshold values other than a majority may be used. In other embodiments, each neural network's classification may be weighed according to the performance level of the particular neural network. If the performance level of a particular neural network is below a predetermined threshold, the artificial neural network's classification may be given less or no weight. For example, the predetermined threshold may be 80%. The predetermined threshold may include a false positive rate, such of above 5%. False positives may include impacts that were placed in the train dataset or signals that were neither impacts nor trains.

Figure 9:
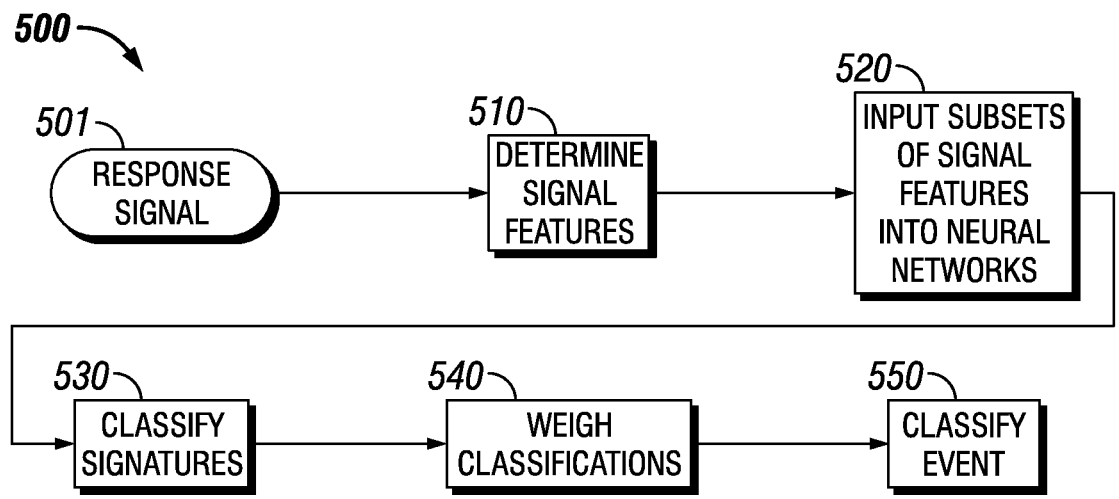
FIG. 9 shows a flowchart of an embodiment of a method for classifying a response signal between an impact event and a non-impact event using subsets of signal features in a plurality of neural networks.

FIG. 9 shows a flowchart of an embodiment of a method 500 for classifying a response signal 501 between an impact event and a non-impact event using a plurality of neural networks. The method 500 includes the Action 510 of determining signal features from the response signal 501. The signal features correspond to unique characteristics of acceleration data of the response signal 501 in either a time domain or frequency domain of the response signal 501. The method 500 includes the Action 520 of inputting different subsets of signal features of the response signal 501 into a plurality of neural networks. Each of the plurality of neural networks are trained using different subsets of signal features. For example, the desired signal features may include the response length feature, the number of peaks feature, the dominant frequency feature, the maximum response feature, the center of mass feature, and/or the slope feature. These six signal features can be arranged in up to 63 unique subsets. The maximum number of subsets is dependent upon the number of signal features being used and can be determined using the formula $2^N-1$, where N is the number of signal feature available. For example, if the slope feature were omitted then 31 unique subsets are possible for the remaining five signal features. Also, for example, if at least two of the five signal features are used, then 26 unique subsets are possible. In some embodiments, only subsets of two or more signal features may be used.

The number of the plurality of neural networks is equal to the number of subsets of signal features being used. Each of the plurality of neural networks is trained using one of the same subset of signal features of the training set. The plurality of neural networks may each be trained individually as described above with respect to a single neural network. When the different subsets of signal features of the response signal 501 are input into the plurality of neural networks, each of the plurality of neural networks classifies the response signal in Action 530 as either an impact signature or a non-impact signature. In Action 540, the classifications of the artificial neural networks are weighed and in Action 550 a final classification of the response signal is made as either an impact event or a non-impact event. By way of example, each neural network's classification may be equally weighted resulting in a final classification of an impact event if a majority "vote" of classifications are an impact signature. Other threshold values other than a majority may be used. In other embodiments, each neural network's classification may be weighed according to the performance level of the particular neural network. If the performance level of a particular neural network is below a predetermined threshold, the artificial neural network's classification may be given less or no weight. For example, the predetermined threshold may be 80%. The predetermined threshold may include a false positive rate, such of above 5%.

Figure 10:
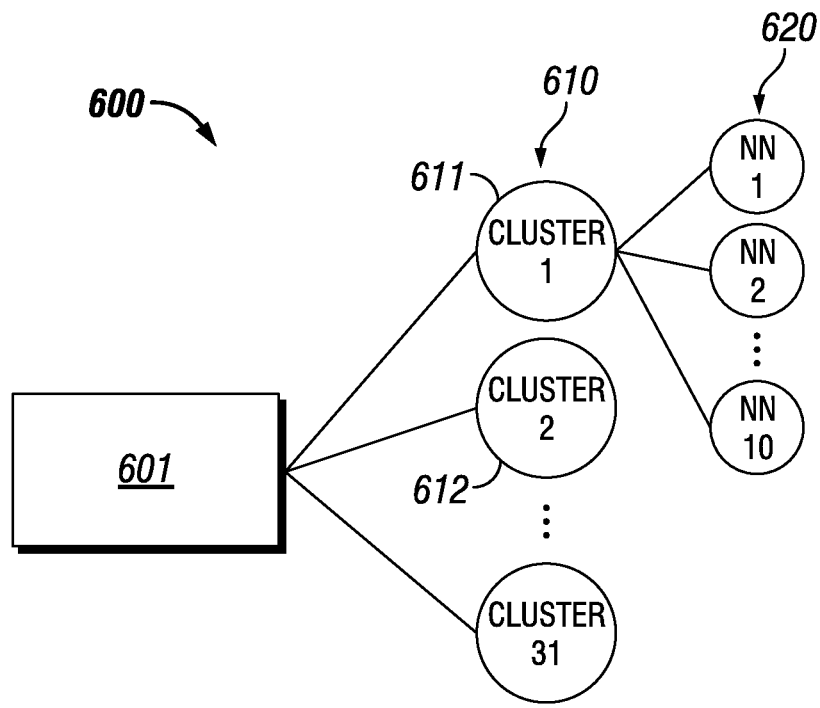
FIG. 10 shows a schematic diagram of an embodiment of an impact detection system.

FIG. 10 shows a schematic diagram of an embodiment of an impact detection system 600. The impact detection system 600 includes a processor 601 to direct the analysis of response signals by neural networks 620. The processor 601 may receive and manage response signals remotely or locally. The processor 601 communicates with a plurality of clusters 610 remotely or locally. Each cluster 610 includes one or more neural networks 620 having different network architectures. The number of clusters 610 may be equal to the number of subsets of signal features to be used. At least some of the clusters 610 may include a plurality of neural networks 620. For example, the 31 unique subsets of five signal features may be used and the corresponding cluster for each subset may include 10 neural networks to form 310 total neural networks. In some embodiments, the clusters 610 for some signal feature subsets may include more neural networks 620 than other clusters 610.

The plurality of neural networks 620 in each cluster 610 may each be trained individually as described above with respect to a single neural network. Each neural network 620 within a cluster 610 is trained using the same subset of signal features of the training set. For example, one cluster 611 may be trained using the response length feature, the number of peaks feature, the dominant frequency feature, the maximum response feature, and the center of mass feature. Another cluster 612 may be trained using only the response length feature and the number of peaks feature. However, within each cluster 610 the initialized and randomized weights and biases may be different for each of the artificial neural networks and result in different trained weights for the artificial neural networks 620 within the cluster 610.

Figure 11:
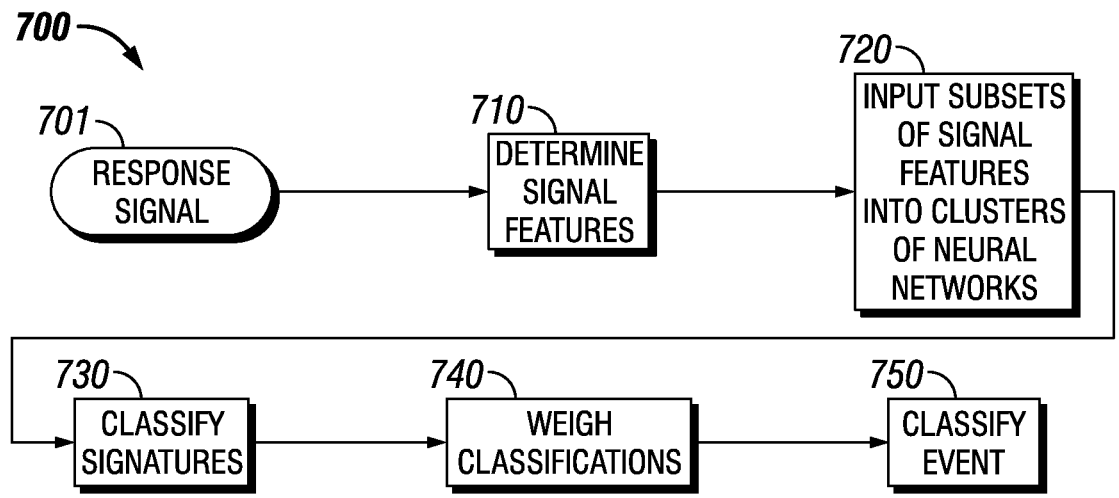
FIG. 11 shows a flowchart of an embodiment of a method for classifying a response signal between an impact event and a non-impact event using subsets of signal features in clusters of neural networks.

FIG. 11 shows a flowchart of an embodiment of a method 700 for classifying a response signal between an impact event and a non-impact event using subsets of signal features in clusters of neural networks. The method 700 includes the Action 710 of determining signal features from the response signal 701. The signal features correspond to unique characteristics of acceleration data of the response signal 701 in either a time domain or frequency domain of the response signal 701. The method 700 includes the Action 720 of inputting different subsets of signal features of the response signal 701 into corresponding clusters of unique neural networks. For each cluster, a unique subset of signal features of the response signal 701 is input into the artificial neural networks within the cluster and each neural network in the cluster classifies the response signal 701 as either an impact signature or a non-impact signature in Action 730. In Action 740, the classifications of the artificial neural networks across all clusters are weighed and in Action 750 a final classification of the response signal is made as either an impact event or a non-impact event. By way of example, each neural network's classification may be equally weighted resulting in a final classification of an impact event if a majority "vote" of classifications are an impact signature. Other threshold values other than a majority may be used. If the performance level of a particular neural network is below a predetermined threshold, the artificial neural network's classification may be given no weight. For example, the predetermined threshold may be 80%. The predetermined threshold may include a false positive rate, such of above 5%.

In other embodiments, within each cluster, the artificial neural network(s) with the highest performance level may be chosen to be weighed with the artificial neural network(s) with the highest performance level of the other clusters. In this manner, the highest performing neural network(s) across all of the clusters may be used to determine a final classification. If the performance level of a particular neural network with the highest performance level is below a predetermined threshold, the artificial neural network's classification may be given no weight. For example, the predetermined threshold may be 80%. The predetermined threshold may include a false positive rate, such of above 5%.

Examples

An overview of test results is shown in Table 1.

TABLE 1

System performance overview

| Array Type | Impact Performance | Avg. Impact Performance | False Positives Rate | Avg. False Positives Rate |
|---|---|---|---|---|
| Individual BPNN | 50%-90% | 81.75% | 0.09%-1.67% | 0.57% |
| 10-BPNN | 70%-100% | 90.00% | 0.00%-1.08% | 0.24% |
| 31-BPNN (unpruned) | 57%-100% | 85.71% | 0.00%-0.93% | 0.12% |
| 31-BPNN (pruned) | 85%-100% | 97.32% | 0.00%-0.93% | 0.12% |
| 310-BPNN | 85%-100% | 96.43% | 0.00%-0.93% | 0.12% |
| 310-BPNN (all bridges) | 85.71% | 85.71% | 0.17% | 0.17% |
| 630-BPNN | 85%-100% | 98.21% | 0.00%-0.93% | 0.12% |
| 630-BPNN (all bridges) | 78.57% | 78.57% | 0.14% | 0.14% |

Datasets containing train and impact signatures from eight different bridges were used to create training datasets. Since a bridge's design (materials, geometry, supports, etc.) affects the bridge's response to a train or impact, unique datasets were created for each of the eight bridges and separate BPNNs were trained for each bridge. The dataset for each bridge contained predominantly train signatures. Impact signatures were scarce due to the rarity of impacts relative to trains. 27 impact signatures were used across all bridge datasets. Thus, each network was trained on train signatures from just one bridge along with impact signatures from multiple bridges.

In order to test and validate the networks, some impact and train signatures were held out of training to be used to "quiz" the trained networks and gauge performance. Approximately 30% of the train signatures and half of the impact signatures for each bridge's dataset were held out of training for network testing and validation. Bridge events were manually isolated from the rest of the signal before signal features were calculated. Table 2 shows a breakdown of the dataset used for each bridge.

TABLE 2

Training and testing dataset breakdown

| Bridge | # Trains (Training) | # Impacts (Training) | # Trains (Testing) | # Impacts (Testing) |
|---|---|---|---|---|
| 1 | 251 | 13 | 110 | 14 |
| 2 | 125 | 13 | 55 | 14 |
| 3 | 257 | 13 | 107 | 14 |
| 4 | 266 | 13 | 114 | 14 |
| 5 | 419 | 13 | 180 | 14 |
| 6 | 254 | 13 | 108 | 14 |
| 7 | 510 | 13 | 216 | 14 |
| 8 | 252 | 13 | 108 | 14 |

A bridge-specific BPNN was tested using the five signal features: response length feature, number of peaks feature, dominant frequency feature, maximum response feature, center of mass feature. Results are given in Table 3.

TABLE 3

Averages and standard deviations of individual BPNN performance

| Bridge # | Impact Performance | Standard Deviation | False Positives Rate | Standard Deviation |
|---|---|---|---|---|
| 1 | 87.00% | 12.52% | 0.27% | 0.42% |
| 2 | 73.00% | 28.69% | 1.27% | 1.16% |
| 3 | 84.00% | 14.30% | 0.37% | 0.46% |
| 4 | 50.00% | 20.00% | 1.67% | 1.27% |
| 5 | 92.00% | 10.33% | 0.50% | 0.63% |
| 6 | 97.00% | 6.75% | 0.19% | 0.37% |
| 7 | 81.00% | 8.76% | 0.09% | 0.28% |
| 8 | 90.00% | 9.43% | 0.19% | 0.37% |

The relatively large standard deviations showed that even with a constant architecture, networks train differently due to the randomness within the initialization process. Performances showed that BPNNs can be used for impact/train classification, however the potential for variability made the use of individual BPNNs less practical.

Since every network was randomly initialized with randomized weights and biases, each network trained and performed slightly differently; to account for this, 10 BPNNs were trained for each bridge with the same dataset so performance results could be averaged. All networks contained two hidden layers with 10 neurons in each hidden layer. The 10 BPNNs that were created for each bridge were assembled into an array. This array functioned as a voting system, whereby when the system received a signal, each of the 10 BPNNs received the same input. Each network then submitted a vote of "impact" or "train". Whichever classification received the most votes was chosen as the system output. Impact performance and false positives rate were improved over the averages for individual BPNNs. Results are shown in Table 4.

TABLE 4

10-BPNN voting array performance

| Bridge | Impact | False Positives |
|---|---|---|
| 1 | 90.00% | 0.00% |
| 2 | 80.00% | 0.00% |
| 3 | 100.00% | 0.83% |
| 4 | 70.00% | 0.00% |
| 5 | 100.00% | 1.08% |
| 6 | 100.00% | 0.00% |
| 7 | 80.00% | 0.00% |
| 8 | 100.00% | 0.00% |

There are many different types of train and impact signatures; no two look identical. While the set of five signal features used in the individual BPNN and 10-BPNN array testing assisted the networks in differentiating between train and impact signatures, it does not necessarily represent the ideal feature set for all signals. In other words, different types of signals may have different ideal feature sets. In order to account for this, a 31-BPNN array was created. Each of the 31 networks received a different unique combination of the five signal features and all possible combinations of the five features were represented.

Similar to the 10-BPNN array, the 31-BPNN array functioned as a voting system, where each network received a vote and the system output was determined by the majority. Performance results are shown in Table 5.

TABLE 5

31-BPNN voting array performance

| Bridge | Impact | False Positives | Adj. False Positives |
|---|---|---|---|
| 1 | 85.71% | 0.00% | 0.00% |
| 2 | 92.86% | 0.00% | 0.00% |
| 3 | 85.71% | 0.00% | 0.00% |
| 4 | 57.14% | 0.00% | 0.00% |
| 5 | 100.00% | 1.08% | 0.00% |
| 6 | 100.00% | 0.93% | 0.93% |
| 7 | 85.71% | 0.00% | 0.00% |
| 8 | 78.57% | 0.00% | 0.00% |

Overall performance for this system was actually lower than that of the 10-BPNN system. This can be attributed to the fact that some of the 31 feature combinations are not suitable for differentiating between train and impact signatures, thus not all networks were capable of accurately classifying a signal and system performance as decreased.

False positives output by each system were studied manually. Some of these false positives were judged to be either impacts that were placed in the train dataset or signals that were neither impacts nor trains. The adjusted false positives rate shown in Table 5 takes these special cases into account and no longer includes them in the false positive calculations.

In order to test the potential of a BPNN array utilizing different combinations of signal feature inputs, networks with inadequate performance were removed or "pruned". Using the same 31-BPNN array outlined above, networks were investigated on an individual basis. The following pruning process was used: (1) All networks within the array were fed all of the testing inputs. (2) Any network with impact performance below 80% or a false positives rate above 5% was pruned. Results for this pruned system are shown in Table 6. The numbers in parentheses next to the bridge number give the final number of networks contained within the array for that bridge after pruning.

TABLE 6

Pruned 31-BPNN voting array performance

| Bridge # | Impact | False Positives | Adj. False Positives |
|---|---|---|---|
| 1 (14) | 92.86% | 0.83% | 0.00% |
| 2 (5) | 100.00% | 1.56% | 0.00% |
| 3 (7) | 100.00% | 0.00% | 0.00% |
| 4 (3) | 100.00% | 0.00% | 0.00% |
| 5 (17) | 100.00% | 1.08% | 0.00% |
| 6 (18) | 100.00% | 0.93% | 0.93% |
| 7 (6) | 85.71% | 0.00% | 0.00% |
| 8 (7) | 100.00% | 0.00% | 0.00% |

Performance increased or remained constant for each bridge. Adjusted false positives rate remained constant across all bridges. These results showed that pruning out low-performance networks increased the ability of the array as a whole to make accurate impact/train classifications while keeping false positives rate low.

All prior systems contained networks with a constant architecture. After it was determined that using a BPNN array with different input sets for each network offered better performance than a system with constant inputs across all networks, the architecture for the 31-BPNN array was expanded. Instead of a single network being assigned to each of the 31 possible signal feature combinations, a cluster of 10 BPNNs with randomly generated network architectures was assigned to each feature combination, resulting in 310 total BPNNs within the array.

The pruning for the 310-BPNN array was as follows: (1) All networks within the array were fed all of the testing inputs. (2) Within each of the 31 clusters, the network with the highest impact performance (including ties) was chosen. (3) If this network had a false positives rate higher than 5%, it was pruned and the network with the second highest impact performance (including ties) was chosen. (4) This process was repeated until either a network or multiple networks passed both steps 2 and 3, or the highest impact performance remaining fell below 80%. It was possible for no networks to be chosen from a cluster. The randomized BPNN architectures could contain up to two hidden layers with up to 25 neurons in each layer. Results are shown in Table 7. As with all prior systems, a different system was created for each of the eight bridges.

TABLE 7

Pruned 310-BPNN voting array performance

| Bridge Name | Impact | False Positives | Adj. False Positives |
|---|---|---|---|
| 1 (97) | 92.86% | 0.83% | 0.00% |
| 2 (53) | 100.00% | 1.56% | 0.00% |
| 3 (58) | 100.00% | 0.00% | 0.00% |
| 4 (28) | 100.00% | 0.00% | 0.00% |
| 5 (154) | 100.00% | 1.08% | 0.00% |
| 6 (179) | 100.00% | 0.93% | 0.93% |

TABLE 7-continued

Pruned 310-BPNN voting array performance

| Bridge Name | Impact | False Positives | Adj. False Positives |
|---|---|---|---|
| 7 (71) | 85.71% | 0.00% | 0.00% |
| 8 (63) | 92.86% | 0.00% | 0.00% |

The 310-BPNN array performances match the 31-BPNN array performances for all bridges except bridge #8, for which performance decreased. False positives rates remained consistent with the 31-BPNN array. One advantage of the 310-BPNN array versus the 31-BPNN array is the substantially larger number of networks used in the final system for each bridge. With an increased number of networks, the pruning process can be made even more stringent.

A 310-BPNN array was created and trained on data from all bridges in order to determine if the high number of networks within the system would be robust enough to handle data from a variety of bridges and still accurately identify impacts. The training dataset consisted of 13 impacts from different bridges as well as 25 trains from each of the eight bridges. The testing dataset consisted of all other trains from all eight bridges (3565 in total) as well as 14 impacts. Pruning was handled in the same manner as it was in the 310-BPNN array. Results are shown in Table 8. While the 310-BPNN array was capable of handling data from all eight bridges, performance was lower than that of all but one of the individual bridge systems.

TABLE 8

Pruned all-bridge 310-BPNN voting array performance

| Networks | Impact Performance | False Positives Rate | Adj. False Positives Rate |
|---|---|---|---|
| 14 | 85.71% | 0.36% | 0.17% |

The framework of the 310-BPNN array was used with the addition of the slope feature, thus creating a 630-BPNN array with 63 network clusters. The increased number of networks and clusters was due to the increase in possible feature combinations inherent with the addition of a sixth feature. The same datasets used for the 31-BPNN array and the 310-BPNN array were used for the 630-BPNN array. Results are shown in Table 9.

TABLE 9

Pruned 630-BPNN voting array performance

| Bridge Name | Impact | False Positives | Adj. False Positives |
|---|---|---|---|
| 1 (251) | 100.00% | 0.83% | 0.00% |
| 2 (136) | 100.00% | 1.56% | 0.00% |
| 3 (140) | 100.00% | 0.00% | 0.00% |
| 4 (95) | 100.00% | 0.00% | 0.00% |
| 5 (280) | 100.00% | 1.08% | 0.00% |
| 6 (386) | 100.00% | 0.93% | 0.93% |
| 7 (129) | 85.71% | 0.00% | 0.00% |
| 8 (162) | 100.00% | 0.00% | 0.00% |

Compared with the 310-BPNN array performance, the 630-BPNN array increased performance for two bridges while matching performance with all other bridges. False positives rates remained unchanged. Results indicated that performance on some bridges can be improved with the addition of the slope feature.

Just as was done with the 310-BPNN array, a 630-BPNN array was created and trained on data from all bridges. The dataset used was the same dataset used for the all-bridge 310-BPNN array. Results are shown in Table 10.

TABLE 10

Pruned all-bridge 630-BPNN voting array performance

| Networks | Impact Performance | False Positives Rate | Adj. False Positives Rate |
|---|---|---|---|
| 3 | 78.57% | 0.28% | 0.14% |

The all-bridge 630-BPNN array had worse performance than the all-bridge 310-BPNN array. This may be due to the response signals of trains for some bridges containing an acceleration spike as the train enters the bridge. This spike would give a high slope feature value, similar to the slope feature values expected for impact signatures. This spike may adversely impact the system during training and testing, something the all-bridge 310-BPNN array and the bridge-specific 630-BPNN arrays would not have to deal with. This spike did not, however, confuse bridge-specific arrays because each of the train data points would include a similar acceleration spike.

Performances for bridge-specific BPNN arrays were considerably higher than performances for arrays that were trained to be able to assess all bridges. This is due to the effect that each bridge's construction and geometry has on its responses to impacts and trains. While trains and impacts can still be differentiated, the features that the networks train on will be less consistent from bridge to bridge than they will be for multiple impacts or trains recorded on a single bridge.

The performance levels of the systems would be improved by iteratively retraining the systems as new impact signatures becomes available. The amount of training data used was limited by a lack of impact data (13 impacts for training, 14 for testing). Impacts comprised less than 10% of the training dataset for each system, which can cause the networks to skew toward train classifications. It is anticipated that all-bridge BPNN arrays would be more successful with a larger impact dataset. Although all-bridge BPNN arrays were effective, the use of the bridge-specific arrays generally resulted in superior performance.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable by a programmable system including at least one programmable processor coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running within the respective computers and having a client-server relationship to each other. In addition, computing devices (i.e., devices having at least one data processor and memory, etc.) can communicate in a peer to peer fashion.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random-access memory associated with one or more physical processor cores.

To provide for interaction with a user, one or more aspects or features of the subject matter described herein can be implemented within a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features.

The subject matter described herein can be embodied in systems, apparatus, methods, and/or articles of any desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. Other implementations may be within the scope of the following claims. Other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A method for classifying a response signal of acceleration data of a structure, the method comprising:
    obtaining a plurality of signal features of a response signal, the response signal comprising acceleration data of a structure, wherein the plurality of signal features are selected from the group consisting of a response length feature, a spectral energy feature, a number of peaks feature, a dominant frequency feature, a maximum response feature, a center of mass feature, a slope feature, an average peak power feature, and a response symmetry feature;
    inputting a first set of signal features of the plurality of signal figures into a first artificial neural network;
    classifying, using the first artificial neural network, the response signal as an impact event or a non-impact event;
    inputting a second set of signal features of the plurality of signal figures of the response signal into a second artificial neural network, the second set of signal features being different from the first set of signal features; and
    classifying, using the second artificial neural network, the response signal as an impact event or a non-impact event.

2. The method of claim 1, further comprising training the first artificial neural network and the second artificial neural network using a set of training events, wherein the first artificial neural network is trained using a first subset of signal features of the set of training events, the first subset of signal features being the same features as the first set of signal features, and the second artificial neural network is trained using a second subset of signal features of the set of training events, the second subset of signal features being the same features as the second set of signal features.

3. The method of claim 1, further comprising weighing the classification of the first artificial neural network and the classification of the second artificial neural network to determine a final classification of the response signal as an impact event or a non-impact event.

4. The method of claim 1, wherein the first set of signal features is input into and classified using a first cluster of neural networks including the first artificial neural network, and the second set of signal features is input into and classified using a second cluster of neural networks including the second artificial neural network.

5. A method for classifying a response signal of acceleration data of a structure, the method comprising:
    obtaining at least one signal feature of a response signal, the response signal comprising acceleration data of a structure;
    inputting the at least one signal feature into an artificial neural network;
    classifying, using the artificial neural network, the response signal as an impact event or a non-impact event;

inputting the at least one signal feature into at least one additional artificial neural network; and classifying, using each of the at least one additional artificial neural network, the response signal as an impact event or a non-impact event.

6. The method of claim 5, further comprising weighing the classifications of the artificial neural network and the at least one additional artificial neural network to determine a final classification of the response signal as an impact event or a non-impact event.

7. The method of claim 5, wherein the at least one additional artificial neural network is a plurality of additional artificial neural networks, each of the plurality of additional artificial neural networks classifying the response signal as an impact event or a non-impact event.

8. The method of claim 5, wherein the response signal includes a frequency domain and a time domain, the frequency domain being a Fourier transform of the time domain, the time domain including a plurality of peaks of the acceleration data, the frequency domain including a plurality of peaks of frequency magnitudes, and the at least one signal feature is selected from the group consisting of a response length feature, a spectral energy feature, a number of peaks feature, a dominant frequency feature, a maximum response feature, a center of mass feature, a slope feature, an average peak power feature, and a response symmetry feature, and wherein the response length feature is a length of the response signal in the time domain, the spectral energy feature is a sum of the squared fast Fourier transform coefficients in the frequency domain, the number of peaks feature is a number of peaks within the frequency domain, the dominant frequency feature is a largest magnitude of the plurality of peaks in the frequency domain, the maximum response feature is a largest magnitude of the plurality of peaks in the time domain, the center of mass feature is a summation of the products of the magnitudes of the response signal in the time domain with its corresponding time divided by a summation of the magnitudes of the response signal in the time domain, the slope feature is a maximum slope between the magnitude of a first peak and the magnitudes of the subsequent peaks in the time domain, the average peak power feature is an average magnitude of the plurality of peaks in the frequency domain, and the response symmetry feature is a ratio of an average magnitude of the plurality of peaks in a first half of the length of the time domain to an average magnitude of the plurality of peaks in a second half of the length of the time domain.

9. The method of claim 8, wherein the at least one signal feature selected from the group includes at least one of the number of peaks feature, the spectral energy feature, or the center of mass feature.

10. The method of claim 8, wherein the at least one signal feature is a plurality of signal features.

11. A method for training an artificial neural network to distinguish between an impact event and a non-impact event, the method comprising:

obtaining signal data for a plurality of event signals, the plurality of event signals including a plurality of training events and a plurality of validation events, the event signals comprising acceleration data, the signal data for each event signal comprising an event signature of either an impact signature or a non-impact signature, the signal data for each event signal further comprising at least one signal feature selected from the group consisting of a response length feature, a number of peaks feature, a spectral energy feature, a dominant frequency feature, a maximum response feature, a center of mass feature, a slope feature, an average peak power feature, and a response symmetry feature; and training an artificial neural network by:

inputting the signal data of the training events of the plurality of event signals into a neural network;

obtaining a predicted training signature from the artificial neural network for each of the training events;

comparing the predicted training signatures with the event signatures to determine an error level; and adjusting iteratively a plurality of internal weights of the artificial neural network until the error level is below a selected threshold.

12. The method of claim 11, further comprising validating the artificial neural network by:

inputting the signal data of the validation events of the plurality of event signals into the artificial neural network;

obtaining a predicted validation signature from the artificial neural network for each of the validation events; and comparing the predicted validation signatures with the event signatures to determine a performance level.

13. The method of claim 12, wherein the at least one signal feature is a plurality of signal features.

14. The method of claim 12, wherein the artificial neural network is a first neural network, and further comprising training and validating a cluster of neural networks using the at least one signal feature, each of the artificial neural networks having a different initial internal weight, the cluster including the first neural network.

15. The method of claim 12, wherein the artificial neural network is a first neural network, and further comprising training and validating a plurality of neural networks including the first neural network, wherein each of the plurality of neural networks is trained and validated using different subsets of signal features.

16. A system for classifying a response signal of acceleration data of a structure, the system comprising:

at least one processor configured to analyze acceleration data of a structure and classify the acceleration data, the at least one processor configured to perform the steps of:

receiving at least one signal feature of a response signal, the response signal comprising the acceleration data of the structure, the response signal including a frequency domain and a time domain, the frequency domain being a Fourier transform of the time domain, the time domain including a plurality of peaks of the acceleration data, the frequency domain including a plurality of peaks of frequency magnitudes;

inputting the at least one signal feature into an artificial neural network; and classifying, using the artificial neural network, the response signal as an impact event or a non-impact event, wherein the at least one signal feature is selected from the group consisting of a response length feature, a spectral energy feature, a number of peaks feature, a dominant frequency feature, a maximum response feature, a center of mass feature, a slope feature, an average peak power feature, and a response symmetry feature, and wherein the response length feature is a length of the response signal in the time domain, the spectral energy feature is a sum of the squared fast Fourier transform coefficients in the frequency domain, the number of peaks feature is a number of peaks within the frequency domain, the dominant frequency feature is a largest magnitude of the plurality of peaks in the frequency domain, the maximum response feature is a largest magnitude of the plurality of peaks in the time domain, the center of mass feature is a summation of the products of the magnitudes of the response signal in the time domain with its corresponding time divided by a summation of the magnitudes of the response signal in the time domain, the slope feature is a maximum slope between the magnitude of a first peak and the magnitudes of the subsequent peaks in the time domain, the average peak power feature is an average magnitude of the plurality of peaks in the frequency domain, and the response symmetry feature is a ratio of an average magnitude of the plurality of peaks in a first half of the length of the time domain to an average magnitude of the plurality of peaks in a second half of the length of the time domain.

17. The system of claim 16, wherein the at least one signal feature is a plurality of signal features.

18. The system of claim 16, wherein the at least one signal feature selected from the group includes the number of peaks feature.

19. The system of claim 16, wherein the at least one signal feature selected from the group includes the spectral energy feature.

20. The system of claim 16, wherein the at least one signal feature selected from the group includes the center of mass feature.

21. The system of claim 16, wherein the at least one signal feature selected from the group includes the response length feature.

22. The system of claim 16, wherein the at least one signal feature selected from the group includes the dominant frequency feature.

23. The system of claim 16, wherein the at least one signal feature selected from the group includes the maximum response feature.

24. The system of claim 16, wherein the at least one signal feature selected from the group includes the slope feature.

25. The system of claim 16, wherein the at least one signal feature selected from the group includes the average peak power feature.

26. The system of claim 16, wherein the at least one signal feature selected from the group includes the response symmetry feature.

27. A system for classifying a response signal of acceleration data of a structure, the system comprising:
at least one processor configured to analyze acceleration data of a structure and classify the acceleration data, the at least one processor configured to perform the steps of:
receiving a plurality of signal features of a response signal, the response signal comprising the acceleration data of the structure;
inputting a first set of signal features of the plurality of signal figures into a first artificial neural network;
classifying, using the artificial neural network, the response signal as an impact event or a non-impact event;
inputting a second set of signal features of the plurality of signal figures of the response signal into a second artificial neural network, the second set of signal features being different from the first set of signal features; and
classifying, using the second artificial neural network, the response signal as an impact event or a non-impact event.

28. The system of claim 27, wherein the at least one processor is further configured to train the first artificial neural network by:
obtaining signal data for a plurality of event signals, the plurality of event signals including a plurality of training events and a plurality of validation events, the signal data for each event signal comprising an event signature of either an impact signature or a non-impact signature;
inputting the signal data of the training events of the plurality of event signals into the first artificial neural network;
obtaining a predicted training signature from the first artificial neural network for each of the training events;
comparing the predicted training signatures with the event signatures to determine an error level; and
adjusting iteratively a plurality of internal weights of the first artificial neural network until the error level is below a selected threshold.

* * * * *